(12) United States Patent
Iwanami et al.

(10) Patent No.: US 6,511,530 B2
(45) Date of Patent: Jan. 28, 2003

(54) COMPRESSOR WITH OIL SEPARATOR

(75) Inventors: Shigeki Iwanami, Okazaki (JP); Yasuhiro Oki, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/835,527

(22) Filed: Apr. 17, 2001

(65) Prior Publication Data

US 2001/0029727 A1 Oct. 18, 2001

(30) Foreign Application Priority Data

Apr. 17, 2000 (JP) .......................................... 2000-114975

(51) Int. Cl.[7] .............................................. B01D 45/12
(52) U.S. Cl. .......................... 96/189; 55/459.1; 55/460; 418/55.6; 418/DIG. 1
(58) Field of Search .................. 96/188, 189; 55/459.1, 55/460; 418/55.6, DIG. 1

(56) References Cited

U.S. PATENT DOCUMENTS 5,499,515 A * 3/1996 Kawamura et al. ........... 418/93
6,152,713 A 11/2000 Hisanaga et al.
6,227,831 B1 * 5/2001 Osima et al. .............. 418/55.6

FOREIGN PATENT DOCUMENTS

JP 7-151083 6/1995

* cited by examiner

Primary Examiner—Robert A. Hopkins
(74) Attorney, Agent, or Firm—Law Offices of David G. Posz

(57) ABSTRACT

In a compressor connected to a discharge pipe for transferring discharged refrigerant to outside, an oil separator has a near column shaped separation chamber which is formed in a housing and whose one end is opened to a surface of the housing, and a separator pipe having a large diameter portion and a small diameter portion both of which are inserted into the separation chamber. The large diameter portion is press fitted to an inner wall of the separation chamber in a vicinity of the opening end thereof so as to form cylindrical space between the small diameter portion and the inner wall of the separation chamber. Further, the discharged pipe is fluid-tightly connected and directly fixed to the housing at the opening end of the separation chamber.

11 Claims, 5 Drawing Sheets

COMPRESSOR WITH OIL SEPARATOR

CROSS REFERENCE TO RELATED APPLICATION

This application is based upon and claims the benefit of priority of Japanese Patent Application No. 2000-114975 filed on Apr. 17, 2000, the content of which is incorporated herein by reference.

BACKGROUND OF THE INVENTION

1. Field of the Invention

The present invention relates to a compressor having an oil separator in which, after refrigerant including lubrication oil is sucked and compressed for lubricating compressor mechanisms, lubrication oil is separated from refrigerant before refrigerant is discharged to outside of the compressor, preferably, applicable to a scroll type compressor for vehicle refrigeration cycle.

2. Description of Related Art

As disclosed in JP-A-7-151083, a conventional compressor for refrigeration cycle has an oil separation chamber constituting a part of an oil separator for separating oil from refrigerant since, if refrigerant including lubricant oil is discharged to an outside of the compressor, refrigeration cycle efficiency decreases.

Further, Jp-A-11-82352 discloses a compact oil separator in which lubrication oil is separated from refrigerant without enlarging an entire body of the compressor.

As shown in FIG. 9 illustrating cross sectional views of the conventional oil separator and an outside discharge pipe 20 connected to the oil separator, the conventional oil separator is composed of an oil separation chamber 11 having introduction and ejection holes 13 and 14, which is formed in a rear housing 4 of the compressor, and a composite joint-separator pipe 12 having a separator pipe 12a and a joint 12b that are integrated into one body, which are fastened and fixed via an O ring 16 for seal to the rear housing 4 by bolts 17.

While the outside discharge pipe 20 is inserted and fitted via another O ring 21 for seal to an inner bore of the composite joint-separator pipe 12, the outside discharge pipe 20 is fastened and fixed via the joint 12 to the rear housing 4 by bolts 22. The composite joint-separator pipe 12 is formed by machining so that manufacturing cost thereof is expensive.

SUMMARY OF THE INVENTION

An object of the invention is to provide a compressor having an oil separator whose construction is simple and manufactured at less cost.

To achieve the above object, in a compressor connected to a discharge pipe for transferring discharged refrigerant to outside, an oil separator is composed of a separation chamber which is formed in a housing and whose one end is opened to a surface of the housing, introduction and ejection bores provided on a wall of the separation chamber and a separator pipe having a large diameter portion and a small diameter portion both of which are inserted into the separation chamber.

With the oil separator mentioned above, the large diameter portion is fixed to an inner wall of the separation chamber in a vicinity of the opening end thereof so that circumferential space between the small diameter portion and the inner wall of the separation chamber is formed so as to communicate the introduction bore with the ejection bore. Further, the discharged pipe is fluid-tightly connected and fixed to the housing at the opening end of the separation chamber.

The separator pipe of the oil separator mentioned above, which may be formed just by pressing a pipe member, is manufactured at lower cost due to better productivity and less material, compared with the conventional composite joint-separator pipe formed by machining. Further, it is not necessary to have the O ring for sealing and the bolts by which the joint is fixed to the housing and to provide screw holes into which the bolts are fastened.

Furthermore, the discharge pipe can be connected directly, not through the joint, to the housing, which is compact and simple in its construction. Moreover, since it is not necessary to fix fluid-tightly the separator pipe to the inner wall of the housing and only the discharge pipe is fluid-tightly connected to the housing, a less number of sealing members such as the O ring is required so that reliability of the oil separator is improved.

It is preferable that the large diameter portion of the separator pipe is press fitted to the inner wall of the separation chamber. The press fitting for fixing is easier than the other fixing processes such as bolt fastening and welding.

Further, preferably, the separation chamber is provided on the inner wall thereof with a step portion which can retain the separator pipe so that the separator pipe is restricted from moving in an opposite direction to the opening end in the separation chamber. It is preferable that the step portion retains an end of the large diameter portion on a side of the small diameter portion or a flange provided on the large diameter portion.

Furthermore, it is preferable that an end of the large diameter portion on a side of the opening end is positioned to face an end of the discharge pipe. With this construction, the separator pipe is restricted by the end of the discharge pipe from coming out the separation chamber toward outside.

Preferably, a slight gap is formed between the end of the large diameter portion on a side of the opening end and the end of the discharge pipe. The slight gap serves to prevent the end of the discharge pipe from hitting against the end of the separator pipe so that fitting seat surface of the discharge pipe comes in close contact with fitting seat surface of the housing to secure the fluid-tightness when the discharge pipe is fixed to the housing.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

First Embodiment

Figure 1:
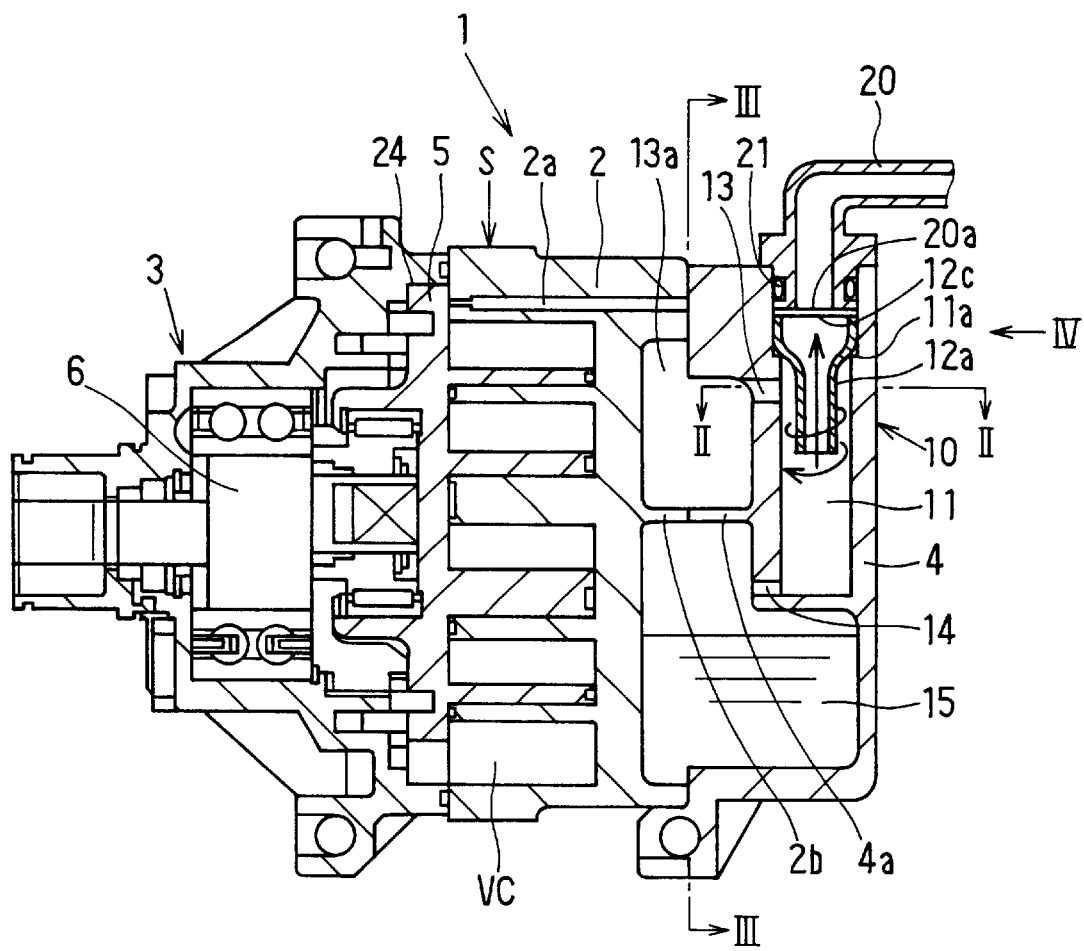
FIG. 1 is a cross sectional view of a compressor with an oil separator according to a first embodiment of the present invention.

A compressor having an oil separator according to a first embodiment is described with reference to FIGS. 1 to 4.

The compressor according to the first embodiment is a scroll type compressor 1 for vehicle refrigeration cycle. A compression mechanism S, which operates to suck, compress and discharge refrigerant (fluid) is composed of a fixed scroll 2 fixed to a front housing 3 and a movable scroll 5 revolving along the fixed scroll 2.

The movable scroll 5 is driven to rotate (revolve) by a shaft 6, which is rotatably held by the front housing 3, so that a volume of operating cavity formed between the fixed and movable scrolls 2 and 5 is enlarged and contracted. Accordingly, refrigerant is sucked into the operating cavity and compressed and discharged. The shaft 6 is driven via a pulley incorporating an electromagnetic clutch (not shown) by a vehicle engine.

A rear housing 4 is fixed through the fixed scroll (shell) to the front housing 3. Lubrication oil is separated from refrigerant discharged from a discharge port (not shown) of the compression mechanism S in a separation chamber 11. Oil separated in the separation chamber 11 is stored in an Oil storage chamber 15. The separation chamber 11 is formed in the rear housing 4 and the oil storage chamber 15 are constituted by the rear housing 4 and the fixed scroll 2.

Figure 2:
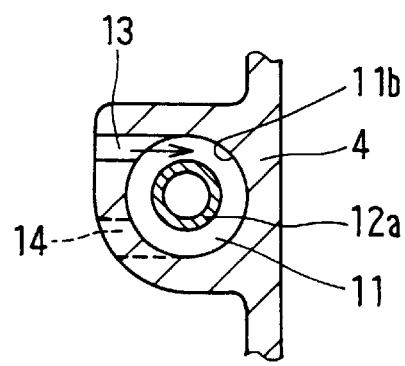
FIG. 2 is a cross sectional view taken along a line II—II of FIG. 1.

As shown in FIG. 2, The separation chamber 11 has a column shaped hollow and is provided on an inner circumferential wall 11b thereof with an introduction bore 13, through which refrigerant discharged from the compression mechanism S is introduced to the separation chamber 11, and an ejection bore 14 through which lubrication oil is ejected to the oil storage chamber 15.

An axial direction of the separation chamber 11 is perpendicular to the surface of oil of the oil storage chamber 15. The introduction bore 13 is formed at more upper position than the ejection bore 14 in the separation chamber 11 and both of the introduction and ejection bores 13 and 14 are opened to the separation chamber 11 so as to extend tangentially to the inner circumferential wall 11b, respectively.

The introduction and ejection bores 13 and 14 are opened toward a side of the fixed scroll 2 so as to extend in same directions. That is, a direction, in which each of the introduction and ejection bores 13 and 14 extends, is parallel to the surface of oil of the oil storage chamber 15 and parallel to an axial direction of the shaft 6.

A near cylindrical separator pipe 12a is coaxially press fitted into the inner circumferential wall 11b of the separation chamber 11. An axial end 12c of the separator pipe 12a faces an end of a discharge pipe 20, through which refrigerant is delivered to outside, fixed via an O ring 21 for seal to the rear housing 4. The separation chamber 11, the separator pipe 12a and the introduction and ejection bores 13 and 14 constitute an oil separator 10.

The introduction bore 13 is formed tangentially to the inner circumferential wall 11b of the separating chamber 11 at a position radially facing an outer wall of the separator pipe 12a. Accordingly, refrigerant introduced into the separation chamber 11 swirls along cylindrical space between the inner circumferential wall 11b and the outer wall of the separator pipe 12a so that lubrication oil is separated from refrigerant without fail.

Further, since the ejection bore 14 is formed tangentially to the inner circumferential wall 11b of the separating chamber 11, lubrication oil separated from refrigerant, which also swirls along the inner circumferential wall 11b of the separation chamber 11, is smoothly ejected from the ejection bore 14.

Figure 3:
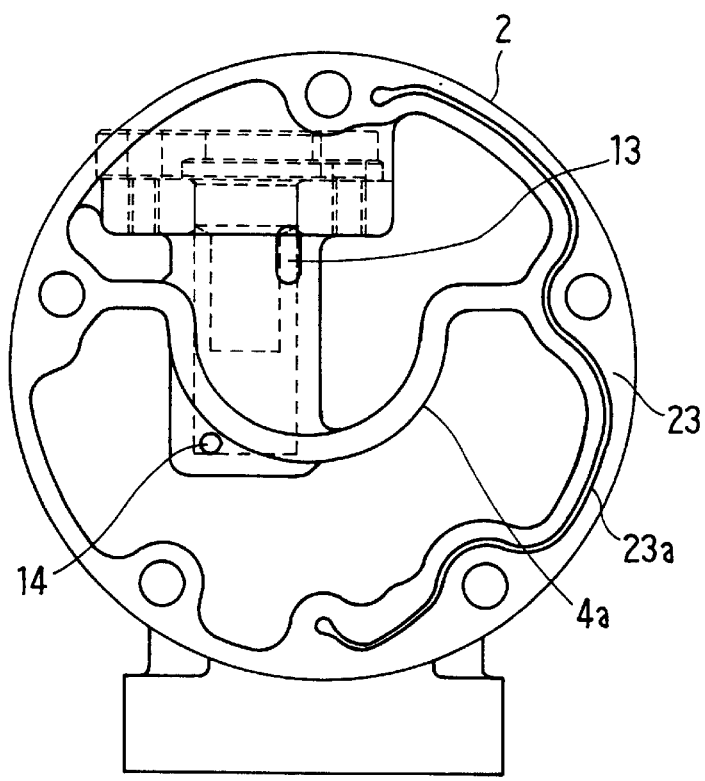
FIG. 3 is a cross sectional view taken along a line III—III of FIG. 1.
Figure 4:
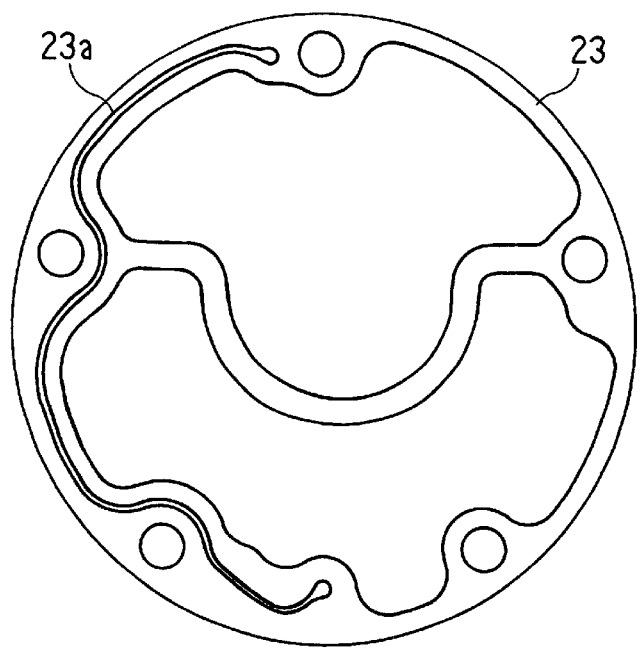
FIG. 4 is a view of a gasket from a side shown by an arrow IV in FIG. 1.

Lubrication oil stored in the oil storage chamber 15 is introduced to an intake chamber 24 of the compression mechanism S via an unusually shaped hole 23a of a gasket 23 disposed between the fixed scroll 2 and the rear housing 4, as shown in FIGS. 3 and 4, and an oil conduit 2a provided in the fixed scroll 2.

A protruding wall (rib) 4a integrally formed with the rear housing 4 and a protruding wall (rib) 2b integrally formed with the fixed scroll 2 constitute a partition wall that divides an introduction conduit 13a, which is formed in the fixed scroll 2 to extend from the discharge port (not shown) to the introduction bore 13, from the oil storage chamber 15.

As mentioned above, the oil separator 10 is composed of the separation chamber 11 which is formed in the rear housing 4 and whose one end is opened to a surface of the rear housing 4, the introduction and ejection bores provided on the wall of the separation chamber 11 and the separator pipe 12a having a large diameter portion and a small diameter portion both of which are inserted into the separation chamber 11.

The large diameter portion of the separator pipe 12a is fixed to an inner wall of the separation chamber 11 in a vicinity of the opening end thereof so that circumferential space between the small diameter portion and the inner wall of the separation chamber is formed so as to communicate the introduction bore 13 with the ejection bore 14. Further, the discharged pipe 20 is fluid-tightly connected and fixed to the rear housing 4 at the opening end of the separation chamber 11.

Figure 9:
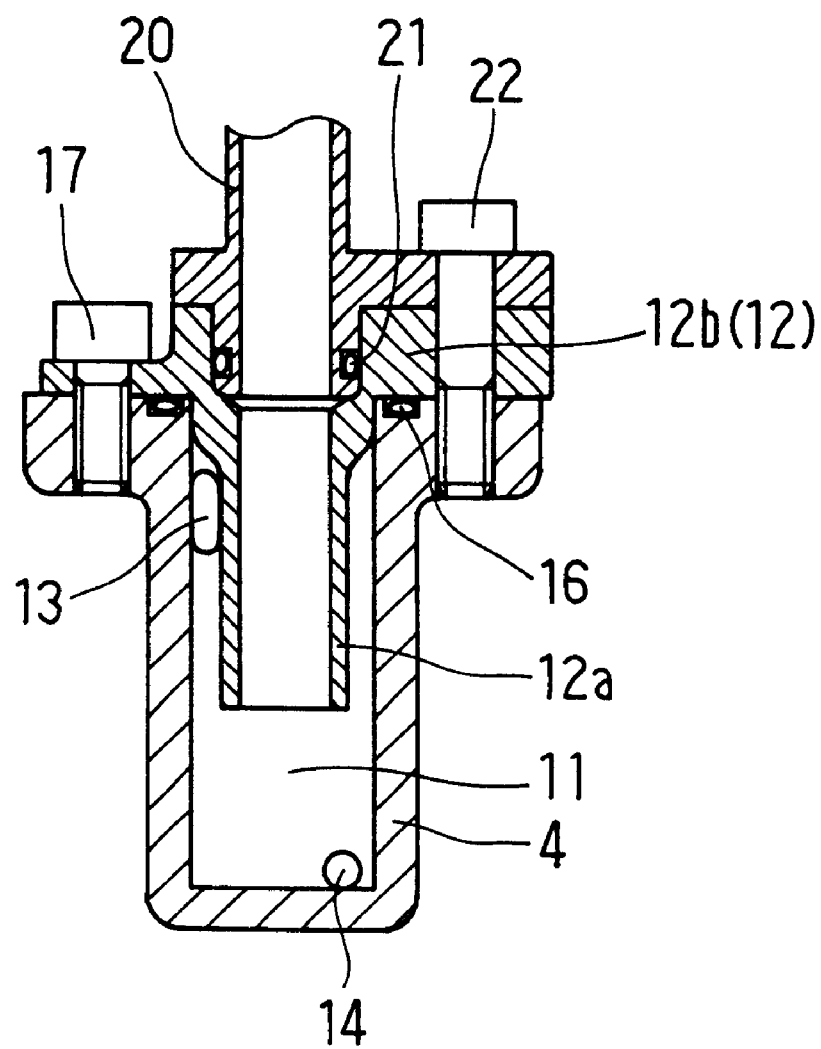
FIG. 9 is a cross sectional view of a conventional oil separator as prior art.

The separator pipe 12a of the oil separator 10, which may be formed just by pressing a pipe member, is manufactured at a lower cost due to its use of less material and the better productivity that results therefrom. In comparison, the conventional composite joint-separator pipe is formed by machining. Further, with reference to FIG. 9, the present invention eliminates the need to have the O ring 16 for seal and the bolts 17 by which the joint 12b is fixed to the rear housing 4 and to provide screw holes into which the bolts 17 are fastened.

Furthermore, the discharge pipe 20 can be connected directly, not through the joint 12b, to the rear housing 4,which is compact and simple in its construction. Moreover, since it is not necessary to fix fluid-tightly the separator pipe 12a to the inner wall of the rear housing 4 and only the discharge pipe 20 is fluid-tightly connected to the rear housing 4, the O ring 16 is not required and only the O ring 21 is required so that reliability of the oil separator is improved.

The large diameter portion of the separator pipe 12a is press fitted to the inner wall of the separation chamber 11. The press fitting for fixing is easier than the other fixing processes such as bolt fastening and welding.

The separation chamber 11 is provided on the inner wall thereof with a step portion 11a which retains the separator pipe 12a so that the separator pipe 12a is restricted from moving in an opposite direction to the opening end in the separation chamber.

An end of the large diameter portion of the separator pipe 12a on a side of the opening end is positioned to face an end of the discharge pipe 20. With this construction, the separator pipe 12a is restricted by the end of the discharge pipe 20 from coming out the separation chamber 11 toward outside.

A slight gap is formed between the end of the large diameter portion of the separator pipe 12a on a side of the opening end of the separation chamber 11 and the end of the discharge pipe 20. The slight gap serves to prevent the end of the discharge pipe 20 from hitting against the end of the separator pipe 12a so that fitting seat surface of the discharge pipe 20 comes in close contact with fitting seat surface of the rear housing 4 to secure the fluid-tightness when the discharge pipe 20 is fixed to the rear housing 4.

Second to Fifth Embodiments

A compressor of an oil separator 10 according to second to fifth embodiments are described with reference to FIGS. 5 to 8. As a construction of compressor on a side of the front housing 3 including the movable scroll 5 in each of the second to fifth embodiments is same as that in the first embodiment, the description thereof is omitted.

Figure 5:
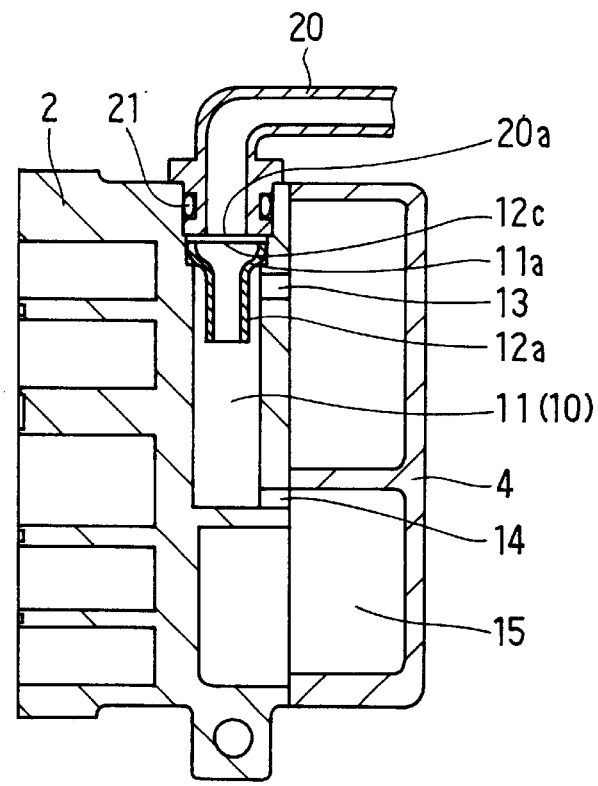
FIG. 5 is a cross sectional view of an oil separator according to a second embodiment of the present invention.

According to the second embodiment, an oil separator 10 (separation chamber 11), as shown in FIG. 5, is formed integrally with a fixed scroll 2. Refrigerant is introduced from an introduction bore 13, which is formed on a wall of the fixed scroll 2 on a side of a rear housing 4, to the separation chamber 11 and lubrication oil separated from refrigerant is ejected from an ejection bore 14, which is also formed on a wall of the fixed scroll 2 on a side of the rear housing 4, to an oil storage chamber 15. A discharge pipe 20 is fixed to the fixed scroll 2.

Figure 6:
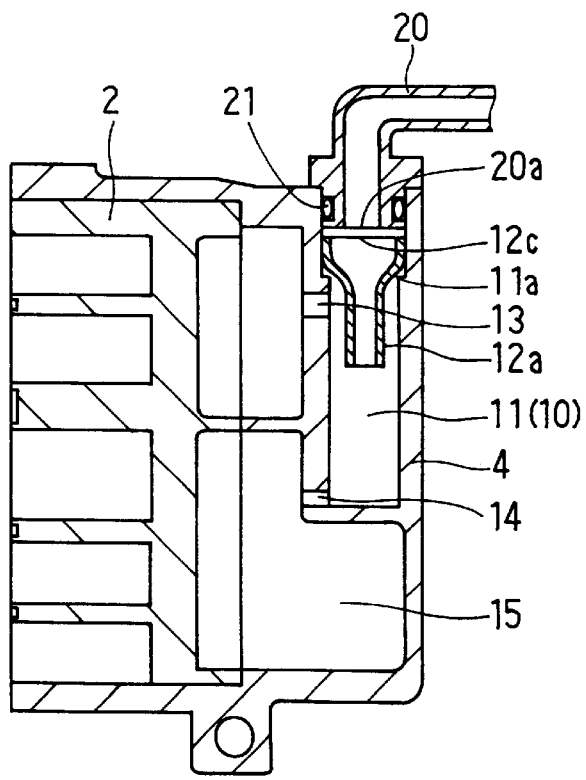
FIG. 6 is a cross sectional view of an oil separator according to a third embodiment of the present invention.
Figure 7:
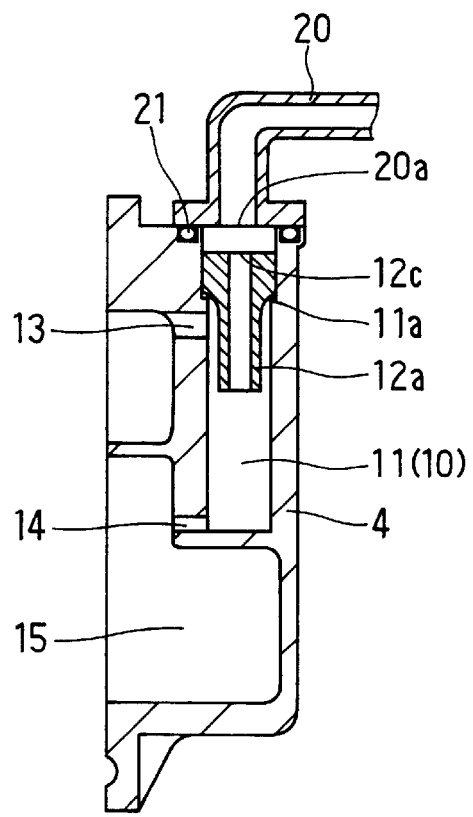
FIG. 7 is a cross sectional view of an oil separator according to a fourth embodiment of the present invention.
Figure 8:
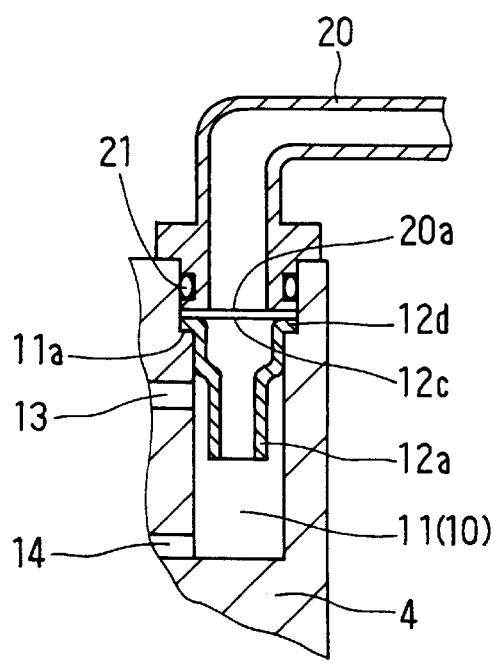
FIG. 8 is a cross sectional view of an oil separator according to a fifth embodiment of the present invention.

According to the third embodiment, an oil separator 10 (separation chamber 11), as shown in FIG. 6, is formed integrally with a shell type rear housing 4 that is formed to wrap up a fixed scroll 2.

In an oil separator 10 according to the fourth embodiment, a discharge pipe 20 is in flat surface contact with and fixed to a rear housing 4. An O ring 21 for seal is put in a groove on a side of the rear housing 4.

In an oil separator 10 according to the fifth embodiment, an separator pipe 12a is provided with a flange 12d which retains the separator pipe 12a not to move in an opposite direction to the opening end of a separation chamber 11.

In the embodiments mentioned above, the separator pipe 12a may be formed with relatively rough dimension by machining or cold forging, instead of pressing.

Further, the compression mechanism S is not limited to a compression mechanism for scroll type compressor but may be a compression mechanism for any other type compressor such as a vane type or a rolling piston type compressor.

What is claimed is:

1. A compressor connected to a discharge pipe for transferring discharged refrigerant to outside, comprising:

a housing;

a compression mechanism provided in the housing for sucking, compressing and discharging refrigerant including oil for lubrication thereof; and an oil separator for separating oil from discharged refrigerant, the oil separator comprising, a separation chamber which is formed in the housing, the separation chamber having an opening end that is opened to a surface of the housing, the separation chamber being provided on a wall thereof with introduction and ejection bores, respectively, and a separator pipe having a large diameter portion and a small diameter portion, both of which are inserted into the separation chamber, the large diameter portion being fixed to an inner wall of the separation chamber in a vicinity of the opening end thereof so that circumferential space between the small diameter portion and the inner wall of the separation chamber is formed so as to allow the introduction bore to communicate with the ejection bore, wherein the discharged pipe is fluid-tightly connected and fixed directly to the housing at the opening end of the separation chamber for communicating with the separation chamber via a ring shaped seal member which is disposed in a gap between the discharge pipe and the housing, the ring shaped seal member having a diameter that is substantially equal to an or greater than outer diameter of the large diameter portion.

2. A compressor according to claim 1, wherein the large diameter portion of the separator pipe is press fitted to the inner wall of the separation chamber.

3. A compressor according to claim 2, wherein the separation chamber is provided on the inner wall thereof with a step portion which retains the separator pipe so that the separator pipe is restricted from moving in an opposite direction to the opening end in the separation chamber.

4. A compressor according to claim 1, wherein an end of the large diameter portion on a side of the opening end is positioned to face an end of the discharge pipe.

5. A compressor according to claim 1, wherein:

the ring shaped seal member is positioned radially outside the opening end of the separation chamber and sandwiched between an outer surface of the discharge pipe and an outer surface of the housing which are axially opposed to and in contact with each other.

6. A compressor according to claim 1, wherein:

a part of the discharge pipe protrudes into the separation chamber; and the ring shaped seal member is sandwiched between the inner wall of the separation chamber and an outer surface of the part of the discharge pipe protruding into the separation chamber.

7. A compressor according to claim 1, wherein the large diameter portion is positioned within the separation chamber so that an outer surface of the large diameter portion always is axially aligned with a horizontal plane having outer boundaries defined by the ring shaped seal member.

8. A compressor according to claim 1, wherein the separator pipe is inserted into the separation chamber via the opening end.

9. A compressor connected to a discharge pipe for transferring discharged refrigerant to outside, comprising:

a housing;

a compression mechanism provided in the housing for sucking, compressing and discharging refrigerant including oil for lubrication thereof, and an oil separator for separating oil from discharged refrigerant, the oil separator comprising, a separation chamber which is formed in the housing, the separation chamber having an opening end that is opened to a surface of the housing, the separation chamber being provided on a wall thereof with introduction and ejection bores, respectively, and a separator pipe having a large diameter portion and a small diameter portion both of which are inserted into the separation chamber, the large diameter portion being press fit to an inner wall of the separation chamber in a vicinity of the opening end thereof so that circumferential space between the small diameter portion and the inner wall of the separation chamber is formed so as to communicate the introduction bore with the ejection bore, wherein the discharged pipe is fluid-tightly connected and fixed to the housing at the opening end of the separation chamber, the separation chamber is provided on the inner wall thereof with a step portion which retains the separator pipe so that the separator pipe is restricted from moving in an opposite direction to the opening end in the separation chamber, and the step portion retains an end of the large diameter portion on a side of the small diameter portion.

10. A compressor connected to a discharge pipe for transferring discharged refrigerant to outside, comprising:

a housing;

a compression mechanism provided in the housing for sucking, compressing and discharging refrigerant including oil for lubrication thereof; and an oil separator for separating oil from discharged refrigerant, the oil separator comprising, a separation chamber which is formed in the housing, the separation chamber having an opening end that is opened to a surface of the housing, the separation chamber being provided on a wall thereof with introduction and ejection bores, respectively, and a separator pipe having a large diameter portion and a small diameter portion both of which are inserted into the separation chamber, the large diameter portion being press fit to an inner wall of the separation chamber in a vicinity of the opening end thereof so that circumferential space between the small diameter portion and the inner wall of the separation chamber is formed so as to communicate the introduction bore with the ejection bore, wherein the discharged pipe is fluid-tightly connected and fixed to the housing at the opening end of the separation chamber, the separation chamber is provided on the inner wall thereof with a step portion which retains the separator pipe so that the separator pipe is restricted from moving in an opposite direction to the opening end in the separation chamber, and the large diameter portion is provided with a flange portion projecting radially and outwardly from outer circumference of the large diameter portion and the step portion retains the flange.

11. A compressor connected to a discharge pipe for transferring discharged refrigerant to outside, comprising:

a housing;

a compression mechanism provided in the housing for sucking, compressing and discharging refrigerant including oil for lubrication thereof; and an oil separator for separating oil from discharged refrigerant, the oil separator comprising, a separation chamber which is formed in the housing, the separation chamber having an opening end that is opened to a surface of the housing, the separation chamber being provided on a wall thereof with introduction and ejection bores, respectively, and a separator pipe having a large diameter portion and a small diameter portion, the large diameter portion being fixed to an inner wall of the separation chamber in a vicinity of the opening end thereof so that circumferential space between the small diameter portion and the inner wall of the separation chamber is formed so as to communicate the introduction bore with the ejection bore, wherein the discharged pipe is fluid-tightly connected and fixed to the housing at the opening end of the separation chamber, an end of the large diameter portion on a side of the opening end is positioned to face an end of the discharge pipe and a slight gap is formed between the end of the large diameter portion on a side of the opening end and the end of the discharge pipe.

* * * * *